United States Patent
Bagepalli et al.

(10) Patent No.: US 7,111,162 B1
(45) Date of Patent: Sep. 19, 2006

(54) LOAD BALANCING APPROACH FOR SCALING SECURE SOCKETS LAYER PERFORMANCE

(75) Inventors: Nagaraj Bagepalli, San Jose, CA (US); Abhijit Patra, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 839 days.

(21) Appl. No.: 09/954,330

(22) Filed: Sep. 10, 2001

(51) Int. Cl.
*H04L 9/00* (2006.01)
*G06F 15/16* (2006.01)

(52) U.S. Cl. ............... 713/151; 709/227; 709/235; 709/237

(58) Field of Classification Search ............ 713/151; 718/105; 709/228, 237
See application file for complete search history.

(56) References Cited

U.S. PATENT DOCUMENTS

| | | | |
|---|---|---|---|
| 5,768,160 A * | 6/1998 | Kakegawa | 703/16 |
| 6,584,567 B1 * | 6/2003 | Bellwood et al. | 713/171 |
| 6,772,333 B1 * | 8/2004 | Brendel | 713/153 |

OTHER PUBLICATIONS

Freier et al., "The SSL Protocol, Version 3.0," <draft-freier-ssl-version3-02.txt>, Internet Engineering Task Force Transport Layer Security Working Group, Nov. 18, 1996.

Cisco Systems, Inc., Cisco CTE 1400 Series Hardware Installation Guide, 2001.

Cisco Systems, Inc., Cisco Content Transformation Engine 1400 Configuration Note, 2001, pp. 1-28.

* cited by examiner

*Primary Examiner*—Gilberto Barrón, Jr.
*Assistant Examiner*—Kristin M. Derwich
(74) *Attorney, Agent, or Firm*—Hickman Palermo Truong & Becker LLP

(57) ABSTRACT

A load-balancing approach for scaling Secure Sockets Layer (SSL) performance is disclosed. During a handshake phase of establishing a SSL connection among a client and server, a processor card identifier value, processor identifier value, and session index value are encoded in a session identifier value that is sent to a client. When the client subsequently resumes the SSL session, it provides the session identifier value, and the encoded values are used for routing the session to an SSL processor that has the negotiated security parameters for the session. In one embodiment, a load balancer distributes the SSL sessions across multiple SSL termination engines that actually carry out SSL processing, based on the card identifier value and the processor identifier. If one of the SSL termination engine cards fails, the load balancer card routes all sessions destined for the failed card to other cards that are operating. The SSL processor that receives such session data determines that it does not have a session table entry matching the session identifier, creates a new session identifier and gives the new session identifier to the client.

29 Claims, 10 Drawing Sheets

Fig. 3B

302 SESSION IDENTIFIER
- 320 FIRST RANDOM VALUE
- 322 SESSION INDEX VALUE
- 324 CARD IDENTIFIER VALUE
- 326 PROCESSOR IDENTIFIER VALUE
- 328 CORE IDENTIFIER VALUE
- 330 SECOND RANDOM VALUE

Fig. 3A

300 SESSION STATE TABLE
- 301A ENTRY
- 301B ENTRY
  - 302 SESSION IDENTIFIER
  - 304 VERSION VALUE
  - 306 CIPHER SUITE
  - 308 COMPRESSION METHOD
  - 310 FLAG VALUES
  - 312 MASTER SECRET

LOAD BALANCING APPROACH FOR SCALING SECURE SOCKETS LAYER PERFORMANCE

FIELD OF INVENTION

The present invention relates to data processing in the field of network communications. The invention relates more specifically to a load balancing approach for scaling Secure Sockets Layer (SSL) performance.

BACKGROUND OF THE INVENTION

The Secure Sockets Layer (SSL) protocol, a network communication protocol originally defined by Netscape Communications Corporation, and improvements such as TLS, provide ways for a client to communicate with a server in a confidential or secure manner over a public network. In basic terms, SSL involves negotiating an encryption method between the client and server, and then encrypting data that is subsequently communicated among the client and server using the negotiated encryption method. In this context, "client" refers to an end station device that receives network services, such as a workstation, personal computer, personal digital assistant, etc., and "server" refers to a processing device that provides network services to one or more clients, such as a server-class computer, mini-computer, mainframe, etc. The client and server may be peers.

SSL communications among a client and server happen in two distinct phases called a "handshake phase" and a "data phase." An alert phase is also defined for identifying and reporting certain errors that occur in the other phases. In the handshake phase, the client and server communicate information that negotiates agreed-upon security parameter values. In basic terms, the handshake phase is carried out because the client and server initially do not know or trust one another and therefore must negotiate a way to encrypt communications among them. In the data phase, the client or server (a "party") encrypts information using the agreed-upon security parameter values and sends it to the opposite party, which decrypts it using the security parameters.

The handshake phase requires the client and server to exchange numerous messages. Further, the handshake process requires the server to carry out a CPU-intensive, time-consuming computation of decrypting a message using private key values, and other encryption parameters using relative complex mathematical calculations. As a result, the handshake phase is time-consuming and intensive in terms of use of processor resources. Therefore, it is desirable to minimize the number of times that the time-consuming and CPU-intensive operations are carried out among a particular client and server.

However, information that is encrypted using SSL is commonly carried over a network using connection-oriented transport protocols, such as Transmission Control Protocol (TCP) and Internet Protocol (IP). Under these protocols, and others, communications among a client and server are carried out using a succession of separate connections to request and receive portions of a message or transaction. For example, when a client requests a Web page from a server that contains one text portion and three embedded images, obtaining the complete Web page might require establishing four TCP/IP connections, communicating the text portion and images under the connections, and terminating the connections. If the Web page is requested using SSL, the client and server may have to carry out the SSL handshake phase repeatedly. Thus, there is a need for a way to establish SSL connections while avoiding time-consuming and CPU-intensive aspects of SSL connection negotiation.

To reduce time and processing overhead involved in repeated negotiation of security parameters in the handshake phase, SSL defines a "session resumption" process. During the handshake phase, the server generates a unique session identifier value (Session ID) and provides the Session ID to the client. Both the client and the server store a mapping between the Session ID and the security parameters agreed upon for a particular Session ID. Thereafter, to establish a separate SSL connection, the client requests the server to set up the connection and provides the Session ID in the request. Since the server has a mapping of the Session ID to the security parameters, the Session ID implicitly informs the server about what security parameters the client is expecting the server to use. The server can encrypt its communications to the client using such security parameters, without negotiating new security parameters, and the client can decrypt the communications. This substantially reduces time and processing resources needed to carry out the handshake phase.

The performance of server systems that use SSL extensively is improved by implementing SSL processing functions in a server element called an SSL termination engine that serves as a SSL proxy. The server system has a plurality of processors that carry out substantive application functions for clients. The SSL termination engines can compute encryption keys, encrypt outgoing data traffic, and decrypt incoming data traffic for a plurality of the processors.

Generally, each of the processors is responsible for responding to a subset of all clients, or for a specified set of sessions. Each of the processors has access to its own session table or other data store in which it stores a mapping of the Session ID values to security parameters that have been negotiated for sessions. When inbound data traffic arrives at a processor, it maps the Session ID in the traffic to the correct security parameters and processes the traffic using such parameters.

Such a system can be further enhanced or "scaled" by providing a plurality of SSL termination engines that are managed by a load-balancing device. In one embodiment, the load-balancing device is in the SSL proxy; alternatively, it may be separate. Client requests all arrive at the load-balancing device. The load-balancing device selects one of the SSL termination engines to handle the request, based on information about the then-current processing load of the SSL termination engines. The client request is passed to the selected SSL termination engine, and processing occurs in the manner described above.

A drawback of this approach is that a session security mapping of a particular processor may lack the required security parameter values for a particular session when traffic for that session is routed to the processor by the load-balancing device. For example, assume that a system can process up to 1024 concurrent SSL sessions. Each SSL Termination Engine may have one or more processors. Assume further that SSL Termination Engine 0 is associated with Processor 0 among a plurality of processors, which is responsible for processing application requests for Session ID values of "0" to "127." Further assume that a client sends the system a request that asks to use SSL session resumption, and provides SSL Session ID "255." However, the load-balancing device determines that SSL Termination Engine 0 has the lightest then-current processing load and should process the request. SSL Termination Engine 0 then forwards the request to Processor 0, but values for Session ID "255" are not in the mapping of Processor 0.

In this situation, Processor 0 is obligated to initiate negotiation of SSL security parameters with the client in the handshake phase, even though the correct security parameters probably are located in a mapping of a different processor. As a result, processing delays occur and processing resources are used unnecessarily. Further, the specific benefits of SSL session resumption are not achieved.

Based on the foregoing, there is a clear need for a way to extend the benefits of SSL session resumption to a system that includes a plurality of load-balanced SSL termination engines and associated processors.

There is a specific need for a way to route successive client requests to a processor that already holds SSL security parameter information for the associated client, so that the client and processor can use SSL session resumption.

SUMMARY OF THE INVENTION

The foregoing needs, and other needs and objects that will become apparent from the following description, are achieved in the present invention, which comprises, in one aspect, a load balancing approach for scaling Secure Sockets Layer performance is described.

According to one embodiment, during a handshake phase of establishing a SSL connection among a client and server, a SSL termination engine identifier value, processor identifier value, and session index value are encoded in a session identifier value that is sent to a client. When the client subsequently resumes the SSL session, it provides the session identifier value, and the encoded values are used for routing the session to an SSL processor that has the negotiated security parameters for the session. In one embodiment, a load balancer distributes the SSL sessions across multiple SSL termination engines that actually carry out SSL processing, based on the SSL termination engine identifier value and the processor identifier.

According to one feature, if one of the SSL termination engines fails, the load balancer routes all sessions destined for the failed engine to other engines that are operating. The SSL processor that receives such session data, determines that it does not have a session table entry matching the session identifier, creates a new session identifier and gives the new session identifier to the client. In one feature, the determination involves determining that the processor ID is not in any part of a session table entry.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a block diagram of an embodiment of a session table;

FIG. 3B is a block diagram of one specific embodiment of a session identifier value;

DETAILED DESCRIPTION OF THE PREFERRED EMBODIMENT

A load balancing approach for scaling Secure Sockets Layer performance is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
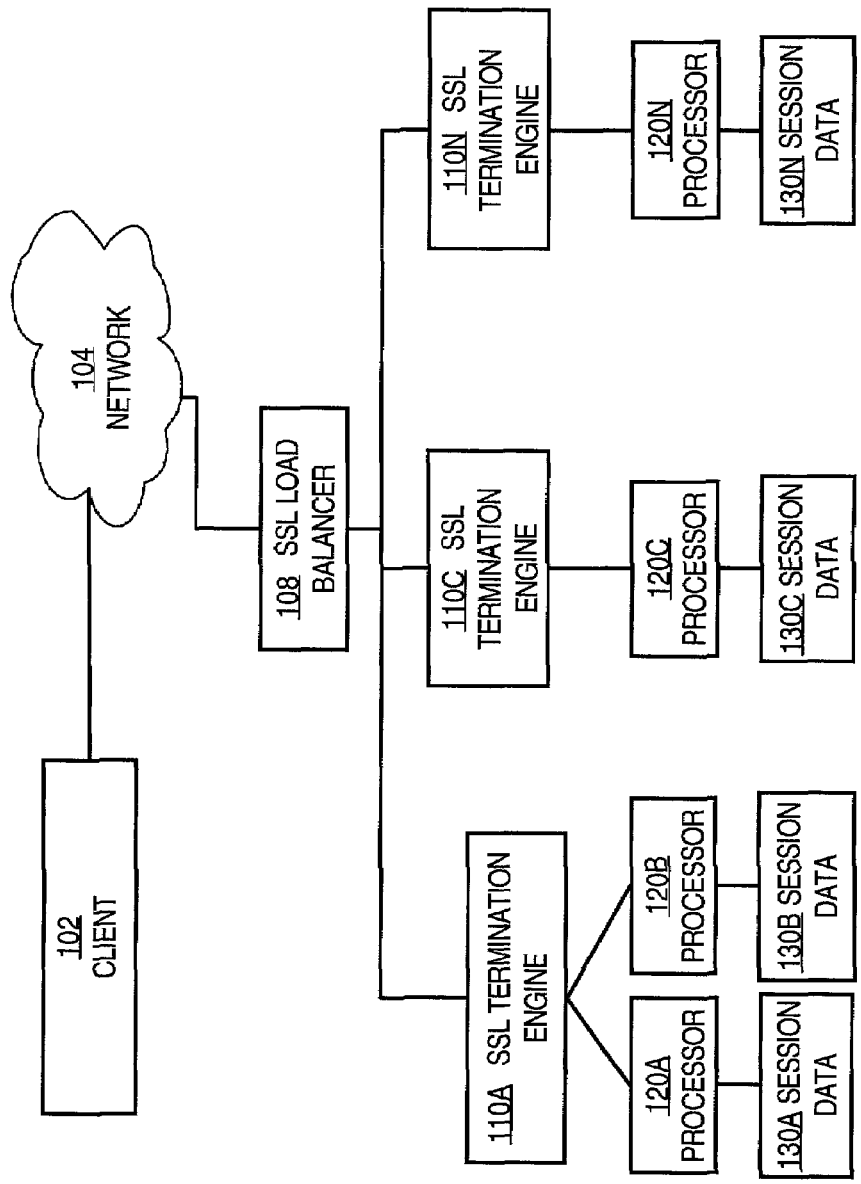
FIG. 1 is a block diagram of load balanced SSL arrangement.

Embodiments are described herein in sections according to the following outline:

1.0 STRUCTURAL OVERVIEW
2.0 FUNCTIONAL OVERVIEW
3.0 HARDWARE OVERVIEW
4.0 EXTENSIONS AND ALTERNATIVES 1.0 Structural Overview FIG. 1 is a block diagram of a load balanced SSL arrangement. A client 102 is communicatively coupled to a network 104. Client 102 is any hardware, software processor, or combination thereof that is capable of network communication and that may have occasion to transmit data that is protected using SSL. For example, client 102 is an end station such as a workstation, personal computer, personal digital assistant, etc. In other embodiments, client 102 is an element of network infrastructure such as a router, switch, gateway, etc.

SSL handshake requests and SSL data requests that are issued by client 102 ultimately are intended to secure data communications between client 102 and a processor selected from among processors 120A, 120B, 120N, etc. In this example, processors 120A, 120B, 120N represent processing elements that are responsible for encrypting and decrypting messages to and from client 102, as opposed to server processors that hold substantive content of interest to client 102.

Each processor 120A, 120B, 120N has access to a corresponding set of session data 130A, 130B, 130N, etc. In certain embodiments, the session data may be consolidated in a single session table that is indexed by session identifier. The session data comprises information identifying a session or connection and one or more specific encryption parameters that a client and server have agreed upon for use in encrypting that session.

Generally, each of the processors is responsible for responding to a subset of all clients, or for a specified set of sessions. Each of the processors has access to its own session table or other data store in which it stores a mapping of the Session ID values to security parameters that have been negotiated for sessions. When inbound data traffic arrives at a processor, it maps the Session ID in the traffic to the correct security parameters and processes the traffic using such parameters.

Connections are routed to processors 120A, 120B, 120N, etc., through one or more corresponding SSL termination engines 110A, 110B, 110N, etc., by an SSL load balancer 108. As first packets of new connections arrive, SSL load balancer 108 selects one of the SSL termination engines and corresponding processors to process packets and carry out encryption and decryption functions for the connection. Each SSL termination engine can compute encryption keys, encrypt outgoing data traffic, and decrypt incoming data traffic for a plurality of the processors. Commercial sources of load balancers include F5 and Alteon.

In one specific embodiment, the SSL termination engines, processors 120A, 120B, 120N, etc., and session data storage are collectively implemented in a hardware circuit card that forms a part of a network infrastructure element, such as a switch or router. However, embodiments are not limited to such implementation. In particular, any element identified herein with the term "card" may be implemented in the form of an electronic circuit card, one or more integrated circuit devices, other electronic hardware, one or more firmware or software elements such as programs, processes, objects, methods, sequences of instructions, etc., or any combination of the foregoing.

Figure 2A:
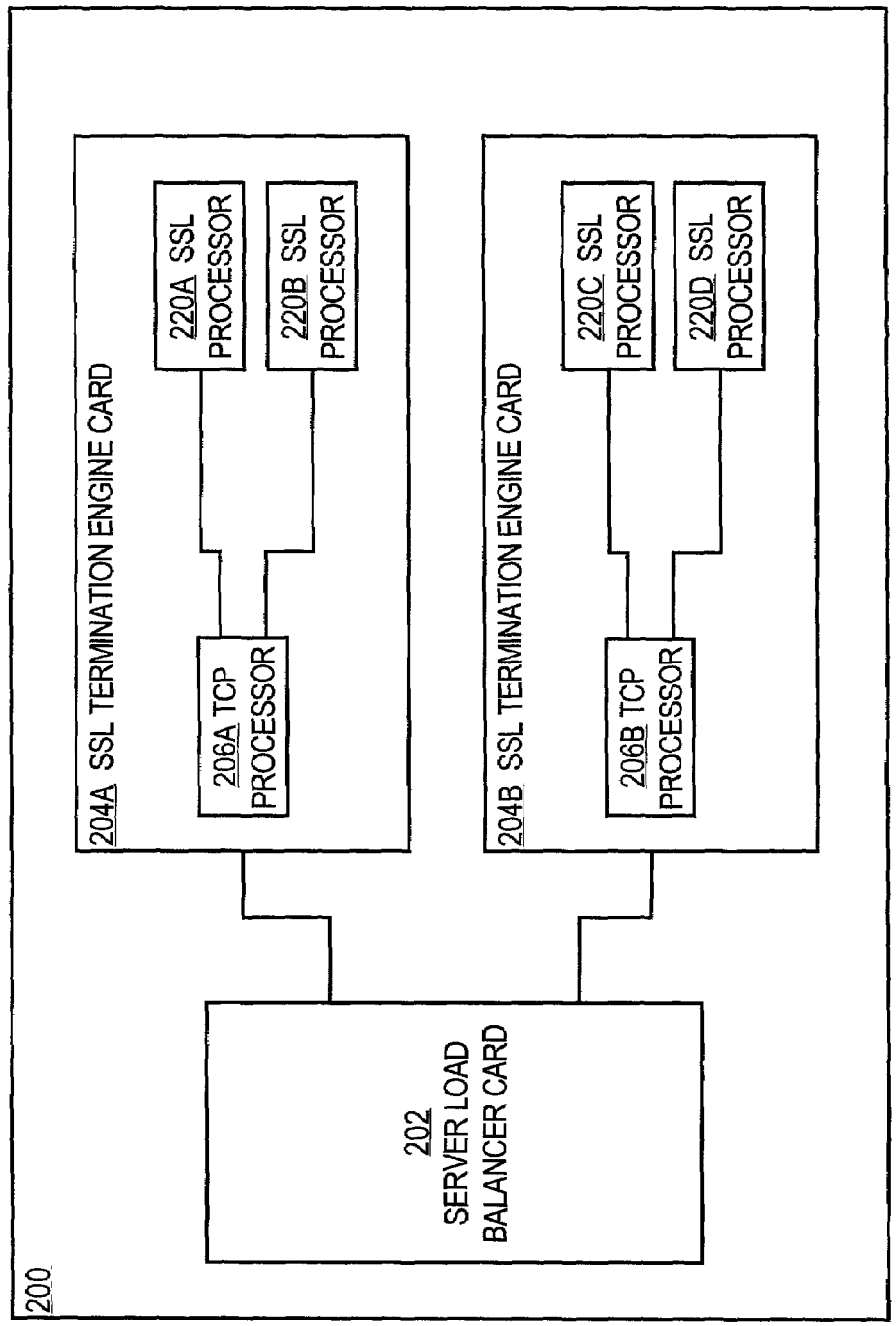
FIG. 2A is a block diagram illustrating an embodiment in a switch device.

FIG. 2A is a block diagram illustrating an embodiment in a switch device. Network hardware element 200 comprises a router, switch, etc. In one specific embodiment, network hardware element 200 is a Catalyst 6000 switch, commercially available from Cisco Systems, Inc., San Jose, Calif. Network hardware element 200 comprises one or more server load balancer (SLB) cards 202, each of which is communicatively coupled to two or more SSL termination engine (STE) cards 204A, 204B and load-balances SSL sessions for them. Each STE card 204A, 204B generally comprises at least one TCP processor 206A that is communicatively coupled to two or more SSL processors 220A, 220B.

In this arrangement, the SSL termination engine circuit card receives packets that form part of an SSL session from other elements of the network hardware element 200, carries out required SSL processing, and forwards the packets or other information as necessary to other elements of the network hardware element 200.

Figure 2B:
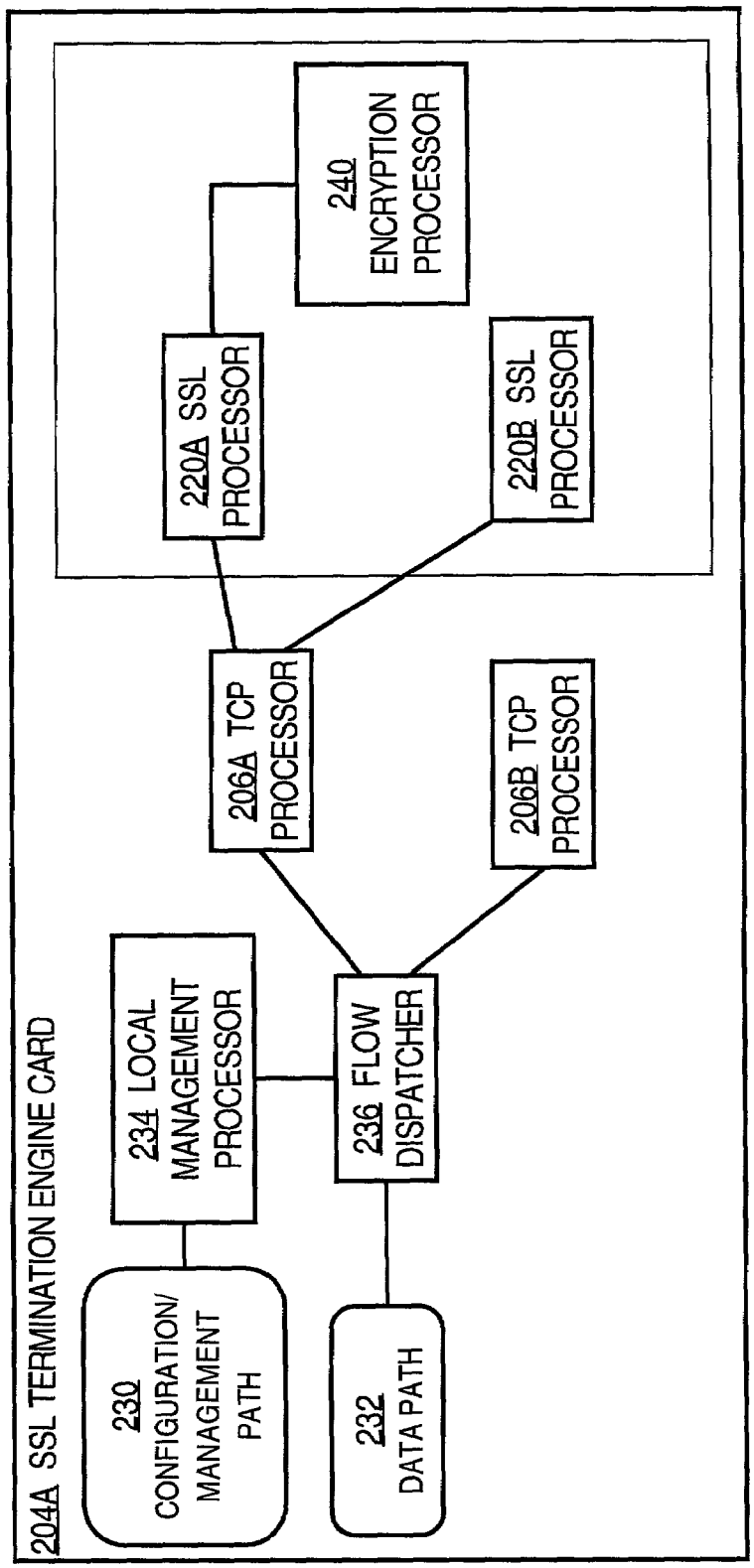
FIG. 2B is a block diagram providing a more detailed view of elements of an SSL termination engine card.

FIG. 2B is a block diagram providing a more detailed view of elements of an SSL termination engine card, according to one embodiment. In general, the SSL termination engine card 204A is logically located between a client and server and provides SSL termination functionality. SSL connections from a client terminate at the SSL termination engine, and decrypted data therefrom is sent to the server in clear text form on another connection. For data segments of an SSL record that arrive on a server connection, the SSL termination engine encrypts the data before sending it on a client connection. The SSL termination engine may be viewed as an SSL server from the perspective of a client. In an embodiment, the SSL termination engine card also provides elements that terminate TCP connections, whose termination is required for SSL protocol processing.

In this example, data packets arrive at SSL termination engine card 204A along either a configuration/management path 230 and a data path 232. Information from data path 232 is communicatively coupled to flow dispatcher 236. Information from configuration/management path 230 arrives at a local management processor 234, which is communicatively coupled to flow dispatcher 236.

Local management processor 234 executes functions for generating public keys and private keys that may be used in key exchange processes in support of SSL, such as RSA key exchange and encryption. Keys may be stored in suitable non-volatile RAM that is communicatively coupled to the local management processor 234.

Flow dispatcher 236 also is communicatively coupled to and can select from two or more TCP processors 206A, 206B. Each of the TCP processors 206A, 206B also is communicatively coupled to and can select from two or more SSL processors 220A, 220B. Each of the SSL processors 220A, 220B is communicatively coupled to an encryption processor 240 that carries out symmetrical encryption and hash calculation functions. For example, encryption processor 240 can carry out DES encryption, triple DES encryption, RC4 encryption, key exchange processing algorithms, etc. In an alternative embodiment, encryption processor 240 is communicatively coupled to one or more separate key exchange processors that execute key exchange algorithms that are used as part of SSL handshaking. Thus, in combination, an SSL processor 220A, 220B and encryption processor 240 can fully implement SSL handshaking.

Figure 2C:
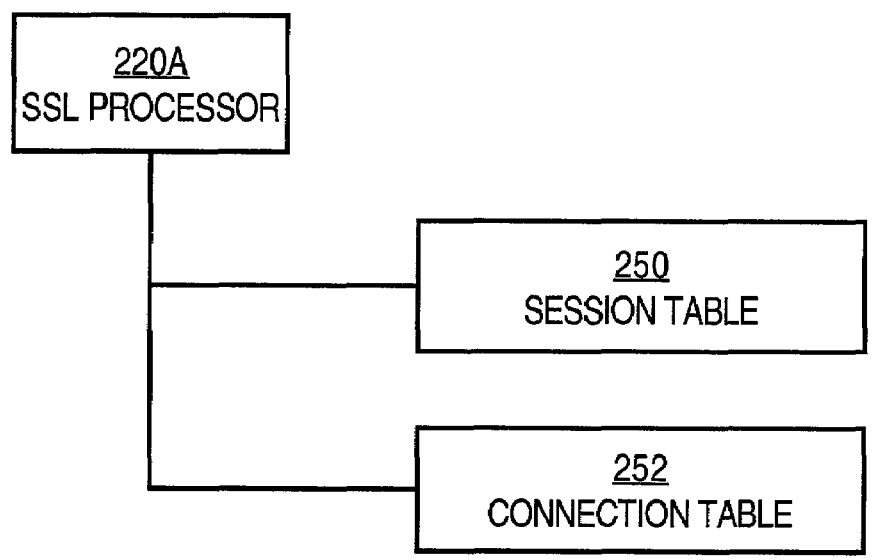
FIG. 2C is a block diagram illustrating control data structures.

Each SSL processor 220A, 220B is communicatively coupled to session data and related control information. FIG. 2C is a block diagram illustrating control data structures that may be used, in one embodiment. In this example embodiment, SSL processor 220A is communicatively coupled to a session table 250 and connection table 252.

FIG. 3A is a block diagram of an embodiment of a session table. In this example embodiment, session table 300 comprises a plurality of session table entries 301A, 301B, etc. Each session table entry 301A, 301B, etc. comprises a Session identifier value 302, a version value 304, a cipher suite value 306, a compression method value 308, one or more flag values 310, and a master secret value 312.

Each session identifier value 302 uniquely identifies a session. FIG. 3B is a block diagram of one specific embodiment of a session identifier value. In this example embodiment, session identifier value 302 is a 32-byte value that comprises a first random value 320, a session index value 322, a card identifier value 324, a processor identifier value 326, and a second random value 330.

The session index value 322 provides an index into the session table. The card identifier value 324 uniquely identifies a particular SSL termination engine card within a particular network element such as a router or switch. The processor identifier value 326 uniquely identifies a particular SSL processor of a particular SSL termination engine card. The processor identifier values 326 may be non-unique across all SSL termination engine cards; thus, two or more SSL termination engine cards may have processors that are identified by processor identifier values of "1." In one alternative embodiment, a core identifier value additionally is used and identifies a particular core in a multi-core processor on a particular SSL termination engine card.

The first and second random values are random numbers that are generated by the key exchange processor.

The version value 304 identifies the version of the SSL protocol that is in use, as negotiated between client and server for a session and connection. The cipher suite value 306 identifies which SSL cipher suite has been negotiated between the client and server. The compression method value 308 identifies which compression method has been negotiated among the client and server.

In one embodiment, session table 250 holds 1,000,000 entries, which allows for more than 3,000 new connections per second with a default session timeout of five minutes. If session table entries are approximately 128 bytes, then 128 MB of storage is sufficient for a session table of 1,000,000 entries.

The connection table 252 stores connection-related information that may vary for each connection. Each connection entry has a pointer to a corresponding session entry. In one specific embodiment, each connection entry is approximately 256 bytes each. In one specific embodiment, a connection entry comprises: a read-write state value; one or more flag values; a record-offset value indicating the start of a record in the segment; a pending-bytes value identifying a number of bytes in the record yet to be received; a total-bytes value identifying the total number of bytes in the record; an identifier of a bound connection; and information identifying queues and segments that have been processed for records that have been received or are in the process of being sent, to facilitate re-assembly of fragmented or pending records.

Accordingly, in an embodiment, when a segment is received by an SSL processor, the SSL processor converts the global connection identifier to a local connection identifier. For example, such conversion can be carried out by a lookup using a translate table. The SSL processor maintains a queue of available local connection identifier values, and allocates one free local connection identifier value for a new connection.

Figure 4:
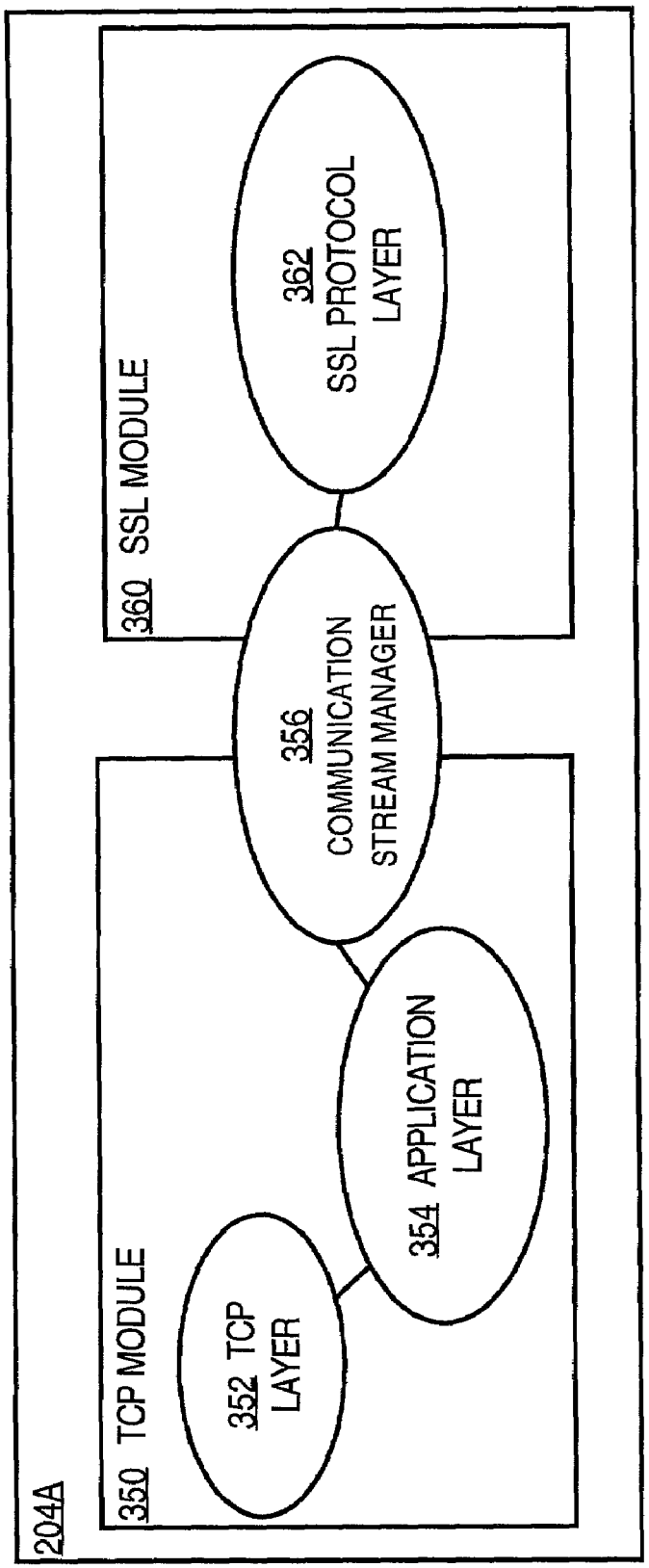
FIG. 4 is a block diagram providing a high-level view of the software functional components involved in providing SSL termination.

FIG. 4 is a block diagram providing a high-level view of the software functional components involved in providing SSL termination.

In this example embodiment, software functional components include a TCP layer 352, application layer 354, communication stream manager 356, and SSL protocol layer 362. The TCP layer 352 and application layer 354 are executed by one of the TCP processors 206A, 206B, as indicated by TCP module 350. Aspects of communication stream manager 356 are executed both by TCP processors and SSL processors 220A, 220B, etc., and SSL protocol layer 362 is executed by the SSL processors as indicated by SSL module 360.

In general, TCP layer 352 is responsible for all TCP functionality, including connection establishment, byte stream ordering, and acknowledgement (ack) processing. When data is received from a client, TCP layer 352 passes data segments to the application layer 354. When data is transmitted from a server to a client, TCP layer 352 is responsible for transmitting data segments reliably.

Application layer 354 acts as a bridge between the TCP layer and SSL layer. When data is received from a client, application layer 354 receives data segments from the TCP layer 352. Such segments are processed and then forwarded to the communication stream manager 356, which forwards them to one of the SSL processors. When data is transmitted from a server to a client, application layer 354 receives data segments from an SSL processor through the communication stream manager 356, carries out required processing, and forwards the data segments to TCP layer 352.

In one specific embodiment, application layer 354 is also responsible for performing load balancing functions by selecting a particular SSL termination engine and processor to handle a particular connection.

For a new client connection, application layer 354 creates a server connection and binds the client and server connections. Each such connection is represented by a set of data values in a data structure in memory. During the data phase, in the client-to-server direction, decrypted data is moved from the client connection to the server connection, and vice versa.

Application layer 354 also splits and re-assembles SSL records. Splitting and re-assembly is carried out as a consequence of the way that TCP delivers packets. When data is received from a client destined for a server, for an SSL record that spans multiple TCP segments, application layer 354 reassembles the SSL record in a queue. When the complete SSL record is received, the record is forwarded to an SSL processor via the communication stream manager 356. Similarly, fragmented records that are received from the communication stream manager 356 are re-assembled in an outbound queue until an entire record is received. The re-assembled record is then forwarded to the TCP layer 352.

If multiple SSL records are present in one TCP segment, each record is sent separately to the SSL processor. Application layer 354 also adds record headers to SSL records that are in transit from the server to the client. Application layer 354 also determines whether the encryption processor encountered any errors in encryption, and if so, sends a control message to the associated SSL processor.

Communication stream manager 356 is responsible for sending data segments from one functional unit to another. In one specific embodiment, communication stream manager 356 manages buffer descriptor rings and context queues that support sending and receiving segments.

The SSL protocol layer 362 implements the SSL protocol. Specifically, SSL protocol layer 362 implements the server-side SSL handshake state machine, implements the SSL application and Alert protocols, interacts with the encryption processor 240 for performing symmetric encryption and message hashing, and performs public key and private key operations.

In this configuration, when data is received from flow dispatcher 236, application layer 354 receives a data segment from TCP layer 352. When application layer 354 has processed the segment, it creates a context in memory and forwards the segment and its context to an SSL processor using communication stream manager 356. The SSL processor performs SSL protocol processing using the segment and based on the context. The SSL processor then creates an application context and encryption context, and forwards both context data to the encryption processor 240.

Based on information in the context data, the encryption processor 240 determines whether to perform encryption or decryption of the segment, and performs such operation. Encryption processor 240 then forwards the resulting encrypted segment data, with the application context, to the SSL processor.

Upon receiving the segment data from the SSL processor, application layer 354 performs transmit direction functions, and forwards the segment to the TCP layer 352.

Application layer 354 communicates with an SSL processor using communication stream manager 356 based on sending and receiving context information. Context information sent from the application layer to the SSL processor includes an opcode, service identifier that identifies keys and certificates, an SSL connection identifier, a bound connection identifier, data length value, etc. Similar context information is sent from the SSL processor to the application layer 354, additionally including a version value, record type value, etc. Opcodes indicate whether to encrypt or decrypt data.

The TCP layer sends both data segments and control segments that request opening connections, closing connections, etc.

When the application layer receives segments on an SSL connection, it receives segments of incomplete SSL records and queues them, and assembles complete SSL records when all segments are received. Complete records are then sent to an SSL processor.

To carry out the handshake phase, the SSL protocol layer 362 sends handshake protocol messages, as defined by the SSL protocol. During the data phase, SSL protocol layer 362 sends decrypted or encrypted data. SSL protocol layer 362 also is responsible to initiate closing a connection.

Each SSL processor and the encryption processor 240 communicate using segment data and context information. The SSL processor sends a data segment and context information to the encryption processor 240, which processes the data and returns it. The operation that is performed on the segment depends on the context information. The context information may include a command, table index values, a buffer area for resulting data, a connection identifier, a message identifier, a segment length value, a record length value, etc.

In the case of a resumed session, data for a particular connection is forwarded to the correct SSL processor based on the Session identifier that is present in the ClientHello SSL record for that connection.

2.0 Functional Overview

According to an embodiment, the benefits of SSL session resumption are extended in a system that includes a plurality of load-balanced SSL termination engines and associated processors by encoding information identifying a specific SSL processor in the SSL session identifier value. Using this process, successive client requests are routed to an SSL processor that already holds SSL security parameter information for the associated client, so that the client and processor can use SSL session resumption.

In one specific embodiment, decoding of processor identifying information in the Session identifier occurs during the handshake phase when SSL module 360 is processing an SSL "ClientHello" message from an SSL-enabled client. For the purpose of clearly illustrating the processing context in which such encoding occurs, a brief description of the SSL handshake phase is now provided.

Figure 5:
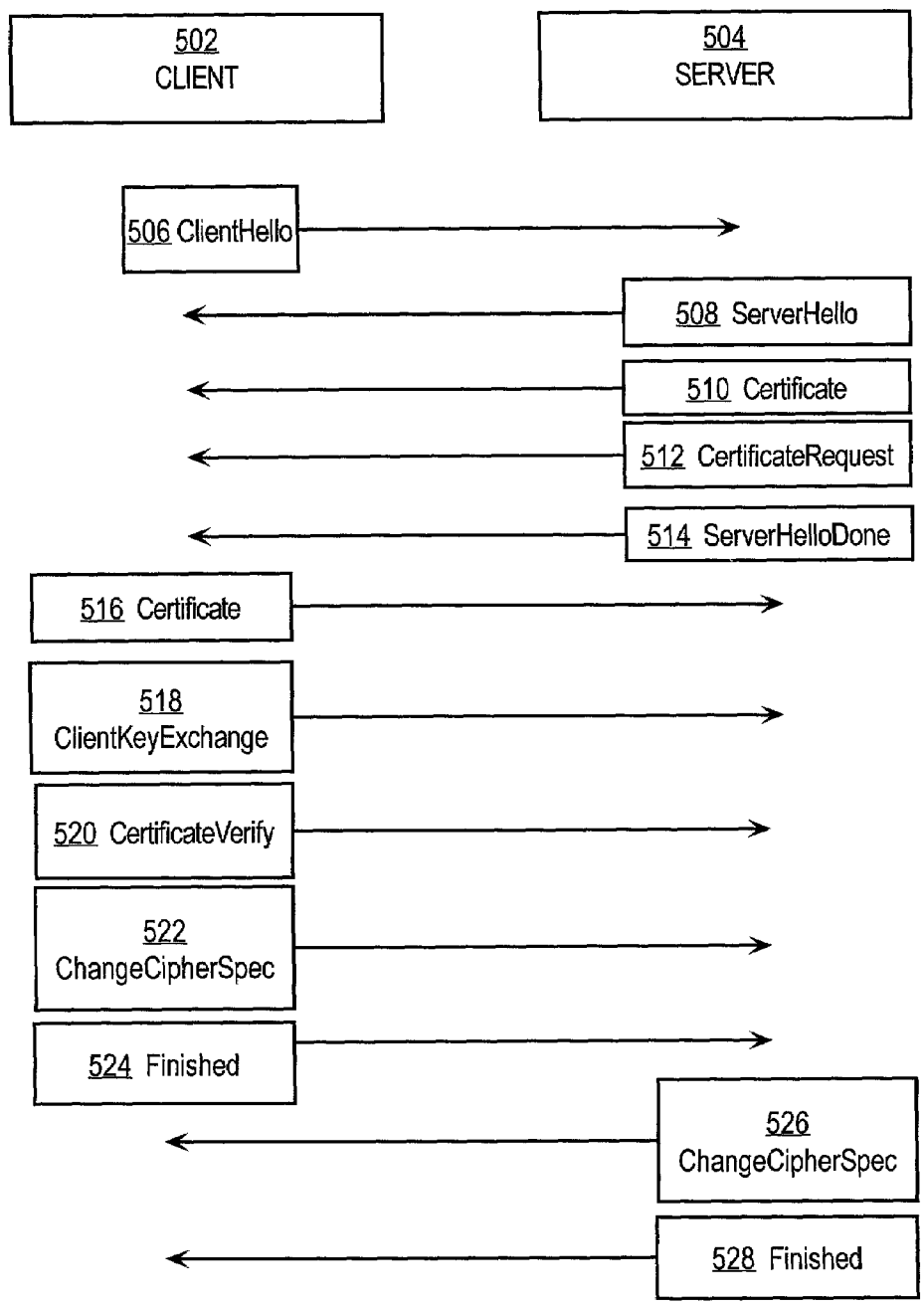
FIG. 5 is a diagram illustrating messages exchanged among an SSL client and SSL server in the handshake phase.

FIG. 5 is a diagram illustrating messages exchanged among an SSL client and SSL server in the handshake phase. In an embodiment, the SSL client may be a network end station element such as a workstation or personal computer, and the SSL server may be SSL termination engine card 204A.

Referring now to FIG. 5, client 502 initiates the handshake phase by sending a ClientHello message 506 to server 504.

In response, server 504 carries out several setup operations. In one embodiment, SSL module 360 selects a cipher suite, and sends a request to the key exchange processor 242 to generate a random number value. The encryption processor 240 is requested to initialize computation of necessary hash values and to include the ClientHello message 506 in the hash computation. When the random number value is received, the server 504 generates a session identifier value using the process described herein with respect to FIG. 6A. The server 504 also creates a ServerHello message 508 that includes the random number value, the session identifier value, and an indication of which cipher suite was selected. The server 504 sends the ServerHello message 508, digital Certificate message 510, and ServerHelloDone message 514. If client authentication is enabled, then server 504 also sends a Certificate Request message 512 to client 502.

In response to the ServerHello group of messages, client 502 sends a Client Key Exchange message 518. The Client Key Exchange message includes an encrypted pre-master secret value. In response, in one embodiment, SSL module 360 sends a request to the key exchange processor 242 to decrypt the pre-master secret. When the decrypted result is received, the SSL module 360 sends a request to the encryption processor 240 to generate a master secret value.

Client 502 next sends ChangeCipherSpec message 522, which in one embodiment is sent from TCP module 350 to SSL module 360. In response, the SSL module 360 sends a request to the encryption processor 240 to generate key information and a hash value that can be used to confirm a subsequent Finished message from the client. Thereafter, the client 502 sends the Finished message 524. Key values are updated and the Finished message is verified.

If client authentication is enabled, the client 502 also sends a Certificate message 516 that identifies the client, and a CertificateVerify message 520.

Thereafter, the server 504 confirms that the requested cipher approach will be in force by sending a ChangeCipherSpec message 526 to the client. The handshake phase concludes when the server 504 sends a Finished message 528 to the client 502. Thus, this message exchange provides the server with a secret value of the client and a specification of which cipher processing approach to use in subsequent encryption; the server informs the client that the requested approach will be used.

The foregoing description is a somewhat simplified description of the entire SSL handshake process. A complete implementation involves numerous other calculations and messages that are not critical to an embodiment of the invention. What is important is that during part of the handshake phase, a session identifier value is generated in an encoded manner as described further herein, for subsequent use by a client when an SSL session is resumed.

In one specific embodiment, the foregoing messages may be implemented in elements of SSL termination engine card 204A using a state machine. The handshake state machine may comprise software instructions in SSL module 360 that are invoked or triggered in response to events or information arriving from TCP module 350 or other elements.

For example, upon arrival of a handshake record from application layer 354 of TCP module 350, the SSL protocol layer 362 invokes the SSL handshake state machine. During handshake processing, one or more requests are sent to encryption processor 240; when responses are received from the encryption processor, the SSL handshake state machine is invoked. Further, during handshake processing, the key exchange processor 242 is requested to provide random number values and encryption or decryption using public keys and private keys. When responses are received from the key exchange processor, the handshake state machine is invoked. Each such invocation may comprise a programmatic function call with appropriate parameters and command values.

Figure 6A:
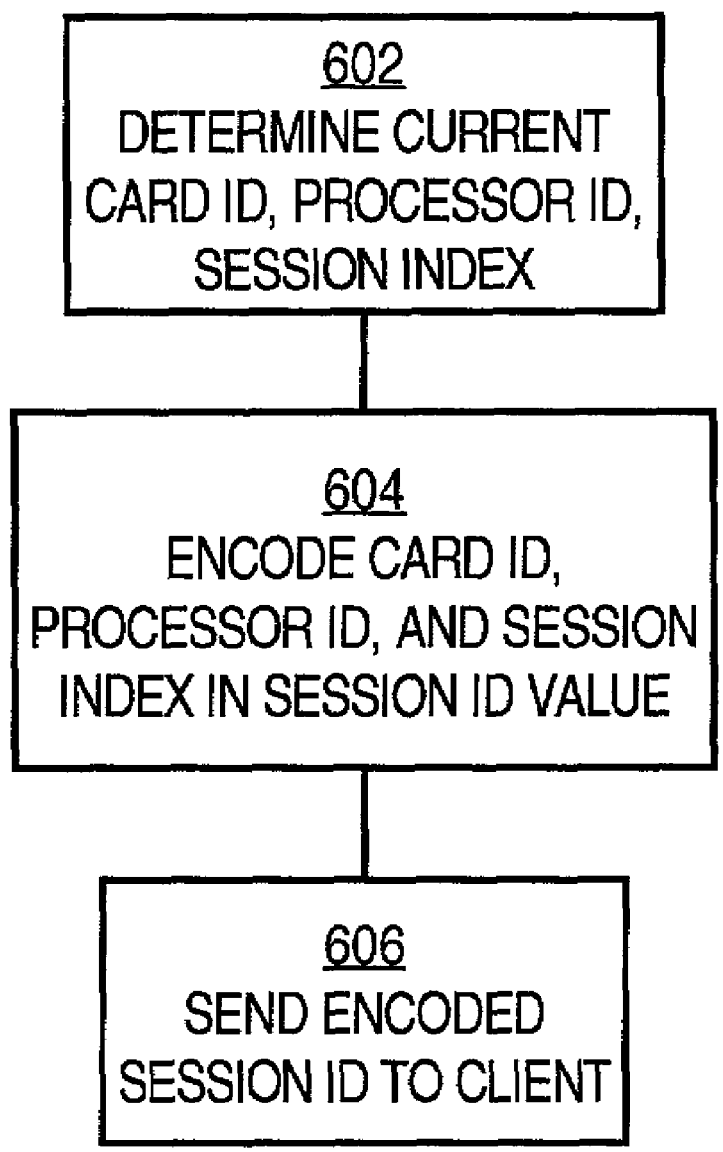
FIG. 6A is a flow diagram of encoding SSL Session identifiers.
Figure 6B:
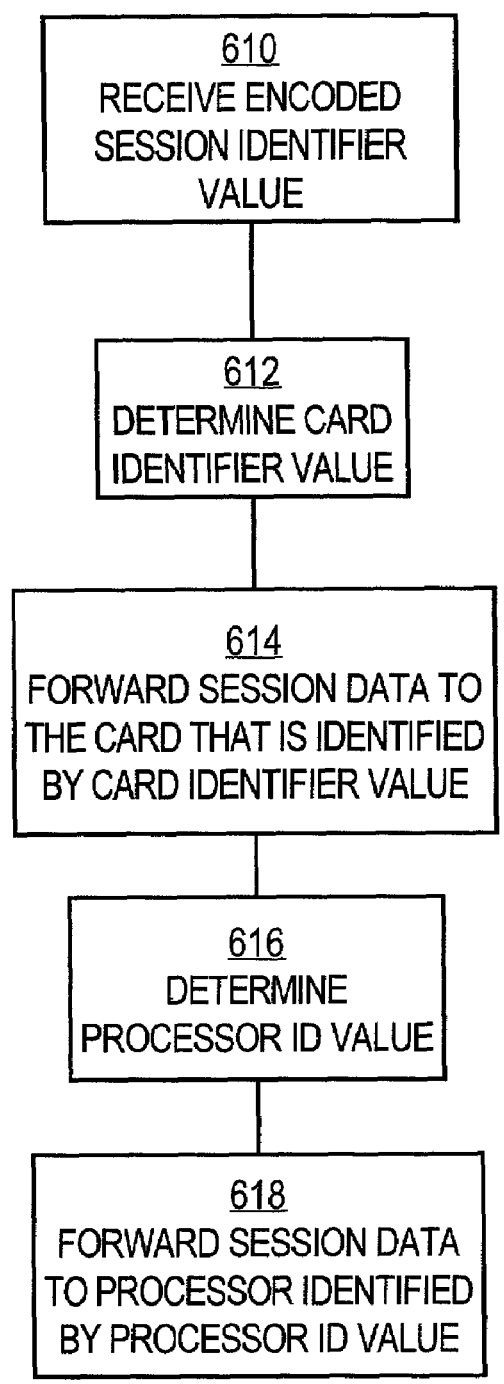
FIG. 6B is a flow diagram of processing data flows that are protected using SSL.

FIG. 6A is a flow diagram of encoding SSL Session identifiers. FIG. 6B is a flow diagram of processing data flows that are protected using SSL. For purposes of illustrating a simple example, the processes of FIG. 6A, FIG. 6B are described herein with reference to FIG. 2A. However, embodiments of the invention are not limited to the context of FIG. 2A, but are broadly applicable to any context in which it is desirable to route an SSL client request in a resumed session to one of a plurality of SSL processors.

The process of FIG. 6A is assumed to occur at an SSL server during the handshake phase of negotiating parameters for a new SSL session. For example, the process of FIG. 6A is carried out as part of the processing carried out by server 504 of FIG. 5 in response to receiving the ClientHello message 506. In subsequent communications of the client and server for the same session, the client provides the session identifier value in its first message to the server. The server detects the session identifier value, determines that the client is resuming an existing session, and therefore skips the time-consuming operations in the handshake phase. Accordingly, the process of FIG. 6A normally occurs only once in an SSL session.

At block 602, a current card identifier value, processor identifier value, and session index value are determined. The card identifier value uniquely identifies a circuit card that contains an SSL processor that is then currently carrying out the handshake phase for the session. In one specific embodiment, as shown in FIG. 2A, an SSL processing system includes a plurality of SSL termination engine cards 204A, 204B. Each such card has a unique identifier associated with it. For simplicity, in this description it is assumed that SSL termination engine card 204A has an identifier of "1" and SSL termination engine card 204B has an identifier of "2". However, in practice any unique identifier values may be used.

The processor identifier value identifies one of a plurality of SSL processors that are on a particular SSL termination engine card. For example, in the embodiment of FIG. 2A, SSL termination engine card 204A has first and second SSL processors 220A, 220B, which are associated respectively with identifier values of "1" and "2". Similarly, SSL termination engine card 204B has first and second SSL processors 220C, 220D, which are associated respectively with identifier values of "1" and "2". The processor identifier values may be non-unique with respect to all SSL processors, but are unique in combination with the card identifier value.

The session index value is a unique value that provides an index into the session table so that subsequent processing can derive the correction session entry and therefore obtain the correct set of SSL processing parameters that are negotiated among the client and server.

In block 604, the card identifier, processor identifier, and session index value are encoded into a session identifier value. The session identifier value is defined in the conventional SSL protocol as a value that may be returned to a client for the purpose of facilitating session resumption. Although, the SSL protocol definition specifies that the session identifier value shall be 32 bytes long, it does not place any requirements on the internal format of the session identifier value. Further, an SSL client is not expected to carry out any processing of the session identifier value, other than to return it to the server when requesting session resumption. The client does not internally manipulate or modify the session identifier value, and therefore returns it unchanged to the server. Accordingly, data may be encoded in the session identifier in a manner that is transparent to the client.

According to one embodiment, the card identifier value, processor identifier value, and session index value are encoded in the session identifier value in the manner shown in FIGS. 3A, 3B. In an alternative embodiment, the processor identifier value additionally comprises a core value. Further, in an alternative embodiment, a single unique processor identifier value is used rather than using a separate card identifier value and processor identifier value.

In block 606, the encoded session identifier is sent to the client.

The process of FIG. 6B is assumed to occur when an SSL proxy receives session data from a client that specifies SSL session resumption. In block 610, an encoded session identifier value is received. For example, in the embodiment of FIG. 2A, server load balancer card 202 receives session data that specifies session resumption and includes an encoded session identifier.

In block 612, the card identifier value is determined. In one embodiment, server load balancer card 202 extracts the card identifier value from the encoded session identifier value.

In block 614, the session data is forwarded to the card that is identified by the card identifier value. In one specific embodiment, server load balancer card 202 forwards or routes the session data to one of the SSL termination engine cards 204A, 204B that is uniquely identified by the card identifier value. Thus, based on the card identifier value, the server load balancer card 202 can distribute SSL sessions across multiple termination engines.

In block 616, the processor identifier value is determined. In one embodiment, the TCP module 350 of the SSL termination engine card 204A, 204B that received the session data extracts the processor identifier value from the encoded session identifier value.

In block 618, the session data is forwarded to the SSL processor that is identified by the processor identifier value. In one specific embodiment, TCP module 350 of the selected SSL termination engine card 204A, 204B that received the session data forwards or routes the session data to one of the SSL processors 220A, 220B, 220C, 220D that is identified by the processor identifier value.

Thus, a card identifier value, processor identifier value, and session index value are encoded in the session identifier value that is sent to a client. Such values are used for routing the session to the processor that has the correct session table entry. In the case of multiple SSL termination engines, a load balancer card is used to distribute the SSL sessions across multiple SSL termination engines. Based on the card identifier value, the load balancer card diverts the session to the processor SSL termination engine. Within the SSL termination engine, based on the processor identifier, a TCP module or processor routes the session to the correct SSL processor. The session index value is used to index into the session table to derive the correct session entry.

In one embodiment, if one of the SSL termination engine cards fails, the load balancer card will route all the sessions destined for the failed card to other cards that are operating. In this case, the SSL processor that receives the session data will determine that it does not have a session table entry matching the session identifier in the session data. In response, the SSL processor creates a new session identifier and gives the new session identifier to the client as part of the ServerHello message.

3.0 Hardware Overview

Figure 7:
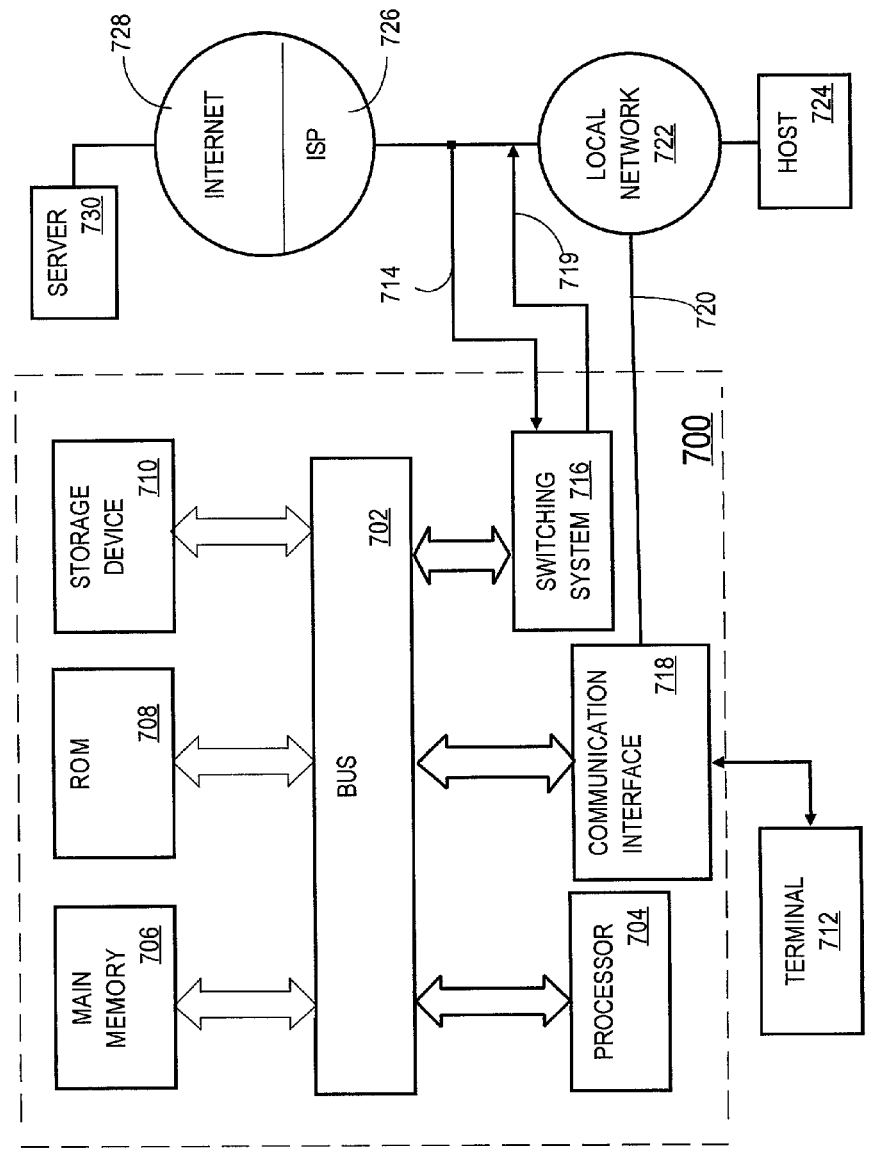
FIG. 7 is a block diagram that illustrates a computer system upon which an embodiment may be implemented.

FIG. 7 is a block diagram that illustrates a computer system 700 upon which an embodiment of the invention may be implemented. The preferred embodiment is implemented using one or more computer programs running on a network element such as a router device. Thus, in this embodiment, the computer system 700 is a router.

Computer system 700 includes a bus 702 or other communication mechanism for communicating information, and a processor 704 coupled with bus 702 for processing information. Computer system 700 also includes a main memory 706, such as a random access memory (RAM), flash memory, or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk, flash memory or optical disk, is provided and coupled to bus 702 for storing information and instructions.

A communication interface 718 may be coupled to bus 702 for communicating information and command selections to processor 704. Interface 718 is a conventional serial interface such as an RS-232 or RS-422 interface. An external terminal 712 or other computer system connects to the computer system 700 and provides commands to it using the interface 714. Firmware or software running in the computer system 700 provides a terminal interface or character-based command interface so that external commands can be given to the computer system.

A switching system 716 is coupled to bus 702 and has an input interface 714 and an output interface 719 to one or more external network elements. The external network elements may include a local network 722 coupled to one or more hosts 724, or a global network such as Network 728 having one or more servers 730. The switching system 716 switches information traffic arriving on input interface 714 to output interface 719 according to pre-determined protocols and conventions that are well known. For example, switching system 716, in cooperation with processor 704, can determine a destination of a packet of data arriving on input interface 714 and send it to the correct destination using output interface 719. The destinations may include host 724, server 730, other end stations, or other routing and switching devices in local network 722 or Network 728.

The invention is related to the use of computer system 700 in a load balancing approach for scaling Secure Sockets Layer (SSL) performance. According to one embodiment of the invention, a load balancing approach for scaling SSL performance is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Communication interface 718 also provides a two-way data communication coupling to a network link 720 that is communicatively coupled to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Network Service Provider (ISP) 726. ISP 726 in turn provides data communication services through the worldwide packet data communication network now commonly referred to as the "Internet" 728. Local network 722 and Network 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Network example, a server 730 might transmit a requested code for an application program through Network 728, ISP 726, local network 722 and communication interface 718. In accordance with the invention, one such downloaded application provides a load balancing approach for scaling SSL performance as described herein.

The received code may be executed by processor 704 as it is received, and/or stored in storage device 710, or other non-volatile storage for later execution. In this manner, computer system 700 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for establishing network communications that use Secure Sockets Layer (SSL) protocol, the method comprising the computer-implemented steps of:

receiving, at a SSL termination engine comprising a plurality of processors, a request from an SSL client to resume a session of SSL-protected data communications, wherein the request includes a session identifier encoded with a processor identifier that uniquely identifies one of the plurality of processors for carrying out SSL processing for the session;

selecting one of the plurality of processors based on the processor identifier;

providing the request to the selected processor.

2. A method as recited in claim 1, wherein the session identifier is further encoded with a card identifier, and further comprising the steps of:

selecting one of a plurality of SSL processing cards based on the card identifier;

providing the request to the selected SSL processing card.

3. A method as recited in claim 1, further comprising the steps of:

in an SSL handshake phase:

determining a processor identifier associated with an SSL processor that is then currently processing a session for the client;

encoding the processor identifier in the session identifier;

providing the session identifier to the client.

4. A method as recited in claim 3, further comprising the steps of:

determining a card identifier associated with an SSL termination engine card that hosts the SSL processor that is then currently processing a session for the client; and encoding the card identifier in the session identifier.

5. A method as recited in claim 1, wherein the step of receiving a request comprises the step of receiving a request from an SSL client to resume a session of SSL-protected data communications, wherein the request includes a session identifier encoded with a random number value, a processor identifier that uniquely identifies one SSL processor among a plurality of processors for carrying out SSL processing for the session, and card identifier associated with an SSL termination engine card that hosts the SSL processor.

6. A method as recited in claim 5, wherein the processor identifier and card identifier in combination uniquely identify the one SSL processor among a plurality of processors that is then currently carrying out SSL processing for the session.

7. A method as recited in claim 1, further comprising the steps of:

receiving a session index value encoded as part of the session identifier value;

using the selected processor, retrieving a plurality of SSL encryption parameter values from a session table managed by the selected processor based on the session index value;

encrypting and decrypting data communications among the client and the selected processor using the SSL encryption parameter values.

8. A method for establishing a network data communications connection using Secure Sockets Layer (SSL) protocol, the method comprising the computer-implemented steps of:

receiving, at a SSL termination engine comprising a plurality of processors, a request from an SSL client to resume a session of SSL-protected data communications, wherein the request includes a session identifier encoded with a processor identifier that identifies one of the plurality of processors for carrying out SSL processing for the session and with a card identifier that uniquely identifies one of the plurality of SSL processing cards that each host one or more of the plurality of processors;

selecting one of a plurality of SSL processing cards based on the card identifier;

providing the request to the selected SSL processing card;

selecting one of the plurality of processors based on the processor identifier;

providing the request to the selected processor of the selected SSL processing card based on the processor identifier.

9. A method as recited in claim 8, further comprising the steps of:

in an SSL handshake phase:

determining a processor identifier associated with an SSL processor that is then currently processing a session for the client;

encoding the processor identifier in the session identifier;

providing the session identifier to the client.

10. A method as recited in claim 8, further comprising the steps of:

determining a card identifier associated with an SSL termination engine card that hosts the SSL processor that is then currently processing a session for the client; and encoding the card identifier in the session identifier.

11. A method as recited in claim 8, wherein the step of receiving a request comprises the step of receiving a request from an SSL client to resume a session of SSL-protected data communications, wherein the request includes a session identifier encoded with a random number value, a processor identifier that uniquely identifies one SSL processor among a plurality of processors for carrying out SSL processing for the session, and card identifier associated with an SSL termination engine card that hosts the SSL processor.

12. A method as recited in claim 8, wherein the processor identifier and card identifier in combination uniquely identify the one SSL processor among a plurality of processors that is then currently carrying out SSL processing for the session.

13. A method for establishing network communications using Secure Sockets Layer (S SL) protocol, the method comprising the computer-implemented steps of:

in an SSL handshake phase:

determining a processor identifier associated with an SSL processor that is then currently processing a session for the client;

encoding the processor identifier in the session identifier;

determining a card identifier associated with an SSL termination engine card that hosts the SSL processor that is then currently processing a session for the client;

encoding the card identifier in the session identifier;

providing the session identifier to the client;

receiving, at a SSL termination engine comprising a plurality of processors, a request from an SSL client to resume a session of SSL-protected data communications, wherein the request includes the session identifier encoded with the processor identifier and with the card identifier;

selecting one of a plurality of SSL processing cards based on the card identifier;

providing the request to the selected SSL processing card;

selecting one of the plurality of processors based on the processor identifier;

providing the request to the selected processor of the selected SSL processing card based on the processor identifier.

14. A computer-readable medium carrying one or more sequences of instructions for establishing network communications that use Secure Sockets Layer (SSL) protocol, which instructions, when executed by one or more processors, cause the one or more processors to carry out the steps of:

receiving, at a SSL termination engine comprising a plurality of processors, a request from an SSL client to resume a session of SSL-protected data communications, wherein the request includes a session identifier encoded with a processor identifier that uniquely identifies one of the plurality of processors for carrying out SSL processing for the session;

selecting one of the plurality of processors based on the processor identifier;

providing the request to the selected processor.

15. A computer-readable medium as recited in claim 14, wherein the session identifier is further encoded with a card identifier, and further comprising instructions which, when executed by the one or more processors, cause the one or more processors to carry out the steps of:

selecting one of a plurality of SSL processing cards based on the card identifier;

providing the request to the selected SSL processing card.

16. A computer-readable medium as recited in claim 14, further comprising instructions which, when executed by the one or more processors, cause the one or more processors to carry out the steps of:

in an SSL handshake phase:
determining a processor identifier associated with an SSL processor that is then currently processing a session for the client;
encoding the processor identifier in the session identifier;
providing the session identifier to the client.

17. A computer-readable medium as recited in claim 16, further comprising instructions which, when executed by the one or more processors, cause the one or more processors to carry out the steps of:

determining a card identifier associated with an SSL termination engine card that hosts the SSL processor that is then currently processing a session for the client; and
encoding the card identifier in the session identifier.

18. A computer-readable medium as recited in claim 14, wherein the step of receiving a request comprises the step of receiving a request from an SSL client to resume a session of SSL-protected data communications, wherein the request includes a session identifier encoded with a random number value, a processor identifier that uniquely identifies one SSL processor among a plurality of processors for carrying out SSL processing for the session, and card identifier associated with an SSL termination engine card that hosts the SSL processor.

19. A computer-readable medium as recited in claim 18, wherein the processor identifier and card identifier in combination uniquely identify the one SSL processor among a plurality of processors that is then currently carrying out SSL processing for the session.

20. A computer-readable medium as recited in claim 14, further comprising instructions which, when executed by the one or more processors, cause the one or more processors to carry out the steps of:

receiving a session index value encoded as part of the session identifier value;

using the selected processor, retrieving a plurality of SSL encryption parameter values from a session table managed by the selected processor based on the session index value;

encrypting and decrypting data communications among the client and the selected processor using the SSL encryption parameter values.

21. An apparatus for establishing network communications that use Secure Sockets Layer (SSL) protocol, comprising:

means for receiving, at a SSL termination engine comprising a plurality of processors, a request from an SSL client to resume a session of SSL-protected data communications, wherein the request includes a session identifier encoded with a processor identifier that uniquely identifies one of the plurality of processors for carrying out SSL processing for the session;

means for selecting one of the plurality of processors based on the processor identifier;

means for providing the request to the selected processor.

22. An apparatus for establishing network communications that use Secure Sockets Layer (SSL) protocol, comprising:

a network interface that is coupled to the data network for receiving one or more packet flows therefrom;

a processor;

one or more stored sequences of instructions which, when executed by the processor, cause the processor to carry out the steps of:

receiving, at a SSL termination engine comprising a plurality of processors, a request from an SSL client to resume a session of SSL-protected data communications, wherein the request includes a session identifier encoded with a processor identifier that uniquely identifies one of the plurality of processors for carrying out SSL processing for the session;

selecting one of the plurality of processors based on the processor identifier;

providing the request to the selected processor.

23. A switch apparatus for a packet-switched data communication network and for establishing network communications that use Secure Sockets Layer (SSL) protocol, the switch apparatus comprising:

a plurality of SSL termination cards each having a plurality of SSL processors;

a load balancer communicatively coupled to the SSL termination cards;

processing modules in each of the SSL termination cards each comprising a memory having one or more stored sequences of instructions which, when executed by one of the processing modules, causes the one of the processing modules to carry out the steps of:

receiving, at a SSL termination engine comprising a plurality of processors, a request from an SSL client to resume a session of SSL-protected data communications, wherein the request includes a session identifier encoded with a processor identifier that uniquely identifies one of the plurality of processors for carrying out SSL processing for the session;

selecting one of the plurality of processors based on the processor identifier;

providing the request to the selected processor.

24. A switch apparatus as recited in claim 23, wherein the session identifier is further encoded with a card identifier, and further comprising sequences of instructions in the processing modules which, when executed by one of the processing modules, cause the one of the processing modules to carry out the steps of: selecting one of a plurality of SSL processing cards based on the card identifier; providing the request to the selected SSL processing card.

25. A switch apparatus as recited in claim 23, further comprising sequences of instructions in the processing modules which, when executed by one of the processing modules, cause the one of the processing modules to carry out the steps of:

in an SSL handshake phase:
determining a processor identifier associated with an SSL processor that is then currently processing a session for the client;
encoding the processor identifier in the session identifier;
providing the session identifier to the client.

26. A switch apparatus as recited in claim 25, further comprising sequences of instructions in the processing modules which, when executed by one of the processing modules, cause the one of the processing modules to carry out the steps of:

determining a card identifier associated with an SSL termination engine card that hosts the SSL processor that is then currently processing a session for the client; and encoding the card identifier in the session identifier.

27. A switch apparatus as recited in claim 23, wherein the step of receiving a request comprises the step of receiving a request from an SSL client to resume a session of SSL-protected data communications, wherein the request includes a session identifier encoded with a random number value, a processor identifier that uniquely identifies one SSL processor among a plurality of processors for carrying out SSL processing for the session, and card identifier associated with an SSL termination engine card that hosts the SSL processor.

28. A switch apparatus as recited in claim 27, wherein the processor identifier and card identifier in combination uniquely identify the one SSL processor among a plurality of processors that is then currently carrying out SSL processing for the session.

29. A switch apparatus as recited in claim 27, further comprising sequences of instructions in the processing modules which, when executed by one of the processing modules, cause the one of the processing modules to carry out the steps of:

receiving a session index value encoded as part of the session identifier value;

using the selected processor, retrieving a plurality of SSL encryption parameter values from a session table managed by the selected processor based on the session index value;

encrypting and decrypting data communications among the client and the selected processor using the SSL encryption parameter values.

* * * * *